US012693872B2

(12) United States Patent     (10) Patent No.:   US 12,693,872 B2
Buys et al.         (45) Date of Patent:     Jul. 28, 2026

(54) MIGRATION OF DOCKING PROFILES FOR INFORMATION HANDLING SYSTEMS

(71) Applicant: Dell Products L.P., Round Rock, TX (US)

(72) Inventors: Trent A. Buys, Seattle, WA (US); Kearson M. McNulty, Austin, TX (US); Cherian Samuel Mathews, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 37 days.

(21) Appl. No.: 18/926,601

(22) Filed: Oct. 25, 2024

(65) Prior Publication Data

US 2026/0119201 A1     Apr. 30, 2026

(51) Int. Cl.
    *G06F 13/00*      (2006.01)
    *G06F 9/445*      (2018.01)
    *G06F 13/40*      (2006.01)

(52) U.S. Cl.
    CPC ........ *G06F 9/4451* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 2017/0228003 A1* | 8/2017 | Brewer | G06F 1/266 |
| 2018/0109627 A1* | 4/2018 | Marquardt | H04L 67/141 |
| 2022/0221926 A1* | 7/2022 | Khosrowpour | G06F 1/3265 |

* cited by examiner

*Primary Examiner* — Henry Tsai
*Assistant Examiner* — Dean Phan
(74) *Attorney, Agent, or Firm* — Fogarty LLP

(57) ABSTRACT

Systems and methods support docking of an Information Handling System (IHS) to a docking station. A docking connection is detected from the IHS to a docking station that provides use of peripheral devices that are coupled to the docking station. However, the docking station is determined to be unrecognized such that it is not associated with a docking profile in a library of docking profiles available to the IHS. A docking profile is generated, such as bey a remote docking support service, for use of the docking station according to known preferences of a user of the IHS. The generated docking profile is adjusted based on the library of docking profiles, where the adjustments migrate user preferences from one or more of the docking profiles to the generated docking profile.

20 Claims, 3 Drawing Sheets

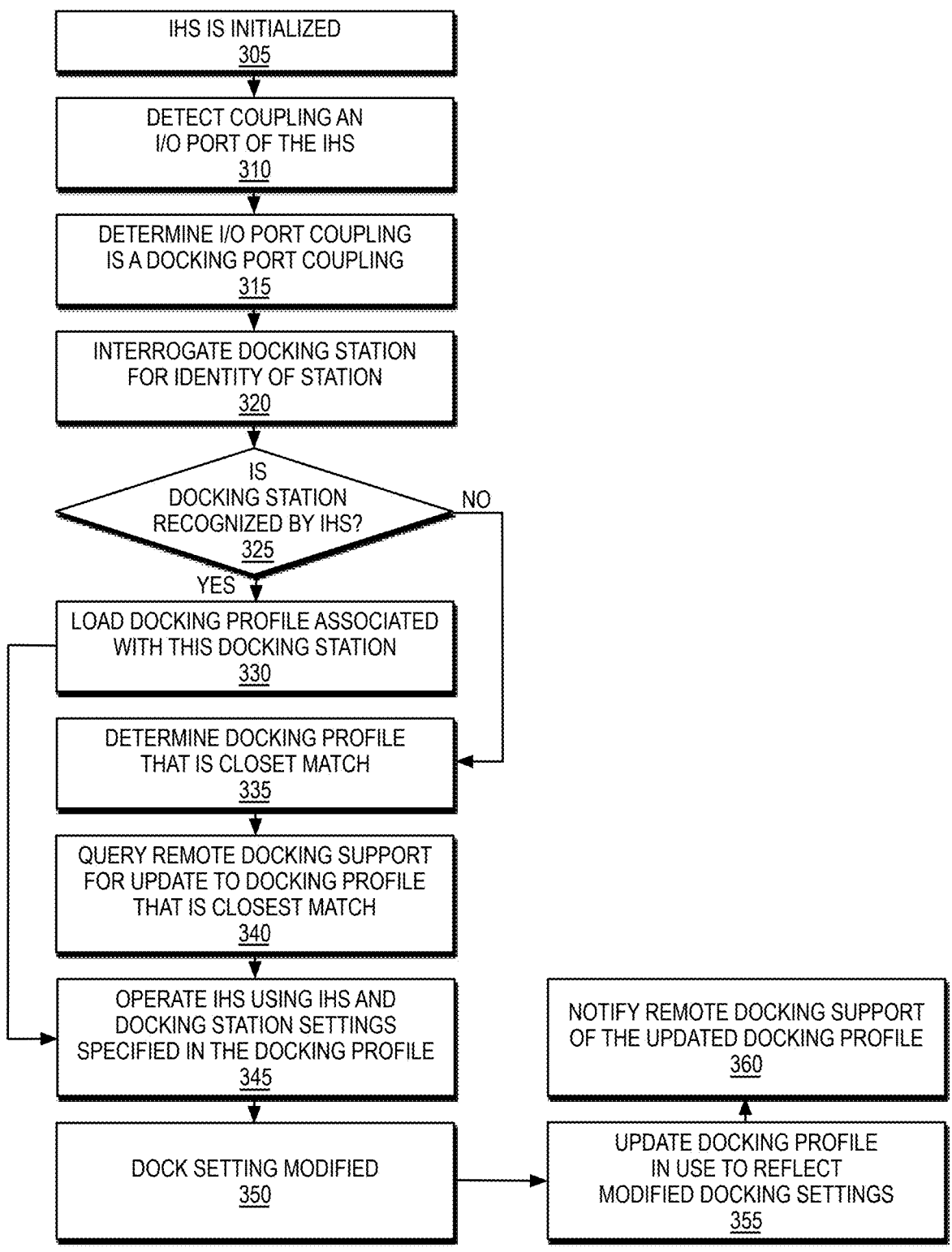

IHS IS INITIALIZED
305

DETECT COUPLING AN
I/O PORT OF THE IHS
310

DETERMINE I/O PORT COUPLING
IS A DOCKING PORT COUPLING
315

INTERROGATE DOCKING STATION
FOR IDENTITY OF STATION
320

IS
DOCKING STATION
RECOGNIZED BY IHS?
325

NO

YES

LOAD DOCKING PROFILE ASSOCIATED
WITH THIS DOCKING STATION
330

DETERMINE DOCKING PROFILE
THAT IS CLOSET MATCH
335

QUERY REMOTE DOCKING SUPPORT
FOR UPDATE TO DOCKING PROFILE
THAT IS CLOSEST MATCH
340

OPERATE IHS USING IHS AND
DOCKING STATION SETTINGS
SPECIFIED IN THE DOCKING PROFILE
345

NOTIFY REMOTE DOCKING SUPPORT
OF THE UPDATED DOCKING PROFILE
360

DOCK SETTING MODIFIED
350

UPDATE DOCKING PROFILE
IN USE TO REFLECT
MODIFIED DOCKING SETTINGS
355

FIG. 3

MIGRATION OF DOCKING PROFILES FOR INFORMATION HANDLING SYSTEMS

FIELD

This disclosure relates generally to Information Handling Systems (IHSs), and more specifically, to docking of IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Various types of mobile IHSs are presently in use, including laptop computers, hybrid laptops that support multiple different physical configurations, tablet computers and smartphones. Some of these mobile IHSs may be coupled to a docking station that supports the use of the mobile IHS while at a workstation that is available at a fixed location. In providing a workstation for mobile IHSs, the docking station may support operation of the mobile IHS using various user devices, such as external displays, speakers, external keyboards and pointing devices. The docking station may also provide power and networking to a coupled IHS.

SUMMARY

In various embodiments, systems and methods include an Information Handling System (IHS) that may include: one or more processors; a memory device coupled to the one or more processors, the memory device storing computer-readable instructions that, upon execution by the one or more processors, cause the IHS to: detect a docking connection of the IHS to a docking station providing use of a plurality of peripheral devices that are coupled to the docking station; determine the docking station is unrecognized and is not associated with a docking profile in a library of docking profiles; generate a docking profile for use of the docking station according to preferences of a user of the IHS; and adjust the generated docking profile based on the library of docking profiles, wherein the adjustments migrate user preferences from one or more of the docking profiles to the generated docking profile.

In some embodiments, execution of the instructions further causes the IHS to adjust the generated docking profile further based on changes by the user to a first docking setting. In some embodiments, the plurality of peripheral devices comprise one or more displays. In some embodiments, the adjustment of the generated docking profile comprises migration, from one of the docking profiles in the library of docking profiles, of an extended desktop configuration utilizing the one or more displays. In some embodiments, the adjustment of the generated docking profile comprises migration, from one of the docking profiles in the library of docking profiles, of a color definition file for operation of the one or more displays. In some embodiments, the adjustment of the generated docking profile comprises migration, from one of the docking profiles in the library of docking profiles, of a power setting for transfer a power from the docking station to the IHS. In some embodiments, the power setting comprises a setting enabling a wireless charging capability of the charging station. In some embodiments, the power setting comprises a setting enabling a turbo mode of power transfers from the charging station for use in charging one or more batteries of the IHS. In some embodiments, the adjustment of the generated docking profile comprises migration, from one of the docking profiles in the library of docking profiles, of a network setting that terminates use of a wired network connection provided by the docking station and initiating use of wireless network controller of the IHS. In some embodiments, the adjustment of the generated docking profile comprises migration, from one of the docking profiles in the library of docking profiles, of a network setting that enables use of a wireless network connection between the IHS and the docking station. In some embodiments, the docking profile is generated on behalf of the IHS by a remote docking support service based on an identity of the docking station reported by the IHS to the docking support service.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 3 is a flow chart diagram illustrating certain additional steps of a process according to various embodiments for migration of docking profiles for operation of an IHS at different docking stations.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
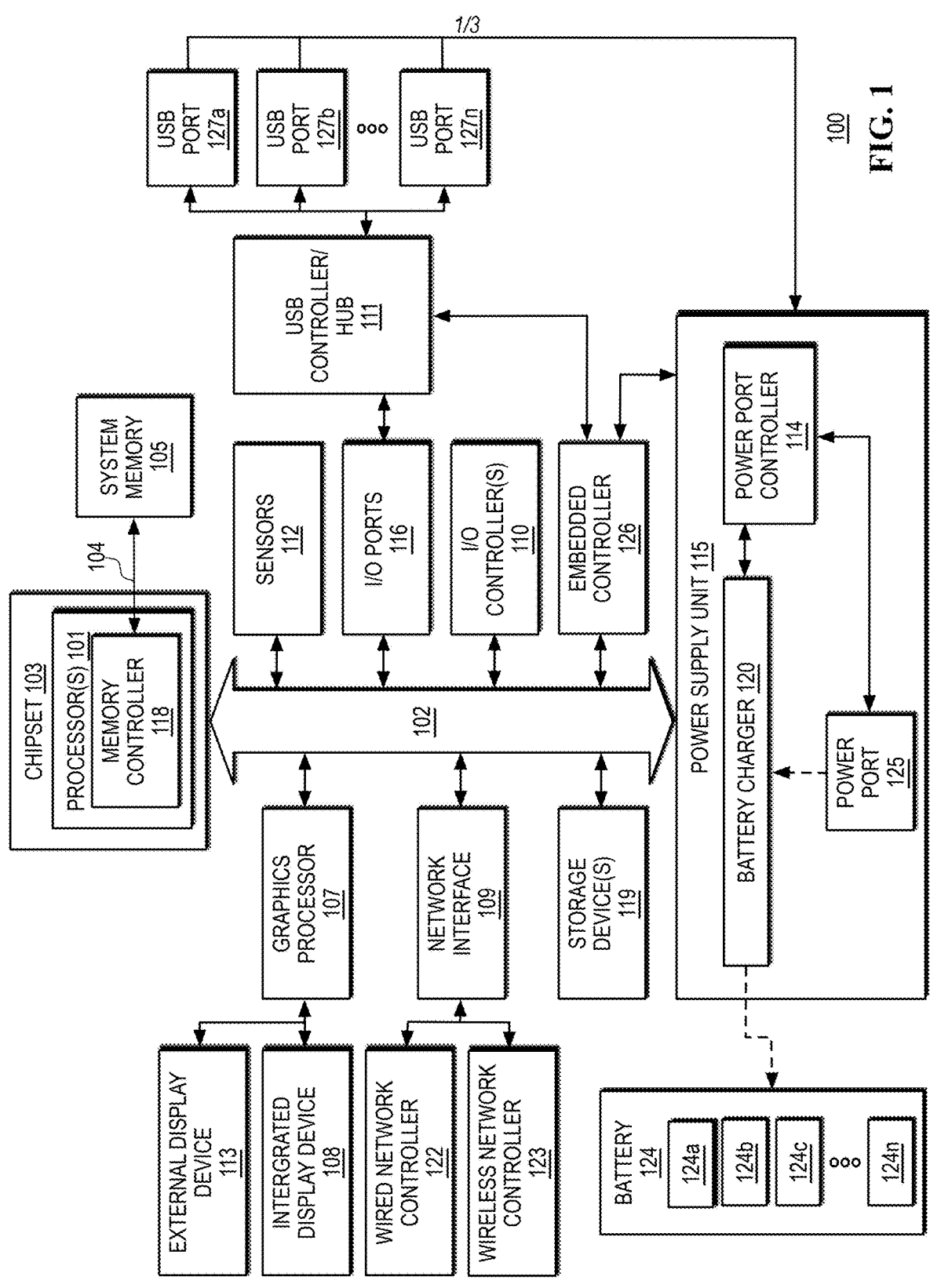
FIG. 1 is a block diagram depicting certain components of an IHS operable according to various embodiments for migration of docking profiles for operation of the IHS at different docking stations.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, a user may transport a mobile IHS 100 between various locations that may include a docking station to which the IHS 100 may be coupled. By coupling the mobile IHS 100 to a docking station, one or more peripheral devices that are coupled to the docking station may be used in the operation of the mobile IHS 100 by a user. In addition, a docking station may provide power transfers and networking capabilities for use by a coupled IHS 100. Being an IHS 100 that is mobile, it may be used in a wide variety of locations and may thus be docked to a wide variety of docking stations. Some users may regularly dock an IHS 100 to the same home and/or office docking station, where these regularly used docking configurations to known docking stations may be relatively optimized with regard to maximizing the capabilities of the docking station and devices coupled to the docking station and reflecting the docking preferences of the user of the IHS 100.

However, some office environments may not include fixed office assignments, such that an IHS 100 may be coupled to any of the docking stations that are made available within any of the docking stations available at any office locations. Similarly, some users may operate an IHS 100 in various forms of shared workspaces that provide communal or otherwise shared docking stations. While traveling, users may operate an IHS using a docking station provided by a hotel, airport or other shared workspace area. In such scenarios, the IHS may be regularly coupled to docking stations of different types, docking stations with different types of peripheral devices available, docking stations using different settings, etc. Due to such variances, an IHS 100 may be functionally coupled to a docking station though the use of default configurations, but these configurations may provide an inconsistent docking experience that requires repeated, manual configuration for adjusting the docking experience to the user's preferences. Moreover, users must manually transfer preferred docking settings to the use of each new docking station, with no carryover from prior docking configurations by the user at other docking stations.

FIG. 1 is a block diagram depicting certain components of an IHS 100 operable according to various embodiments for migration of docking profiles in order to provide consistent operation of the IHS 100 at different docking stations. In some embodiments, IHS 100 may be a laptop or tablet that may be coupled to a docking station that includes user I/O devices by which a user can operate the IHS 100. As described, an IHS 100 may be coupled to a docking station that may also provide power and networking to the IHS 100 in addition to providing use of various peripheral devices, that may include external display devices and user input devices such as keyboards and pointing devices. In order to support coupling of IHS 100 to recognized and unrecognized docking stations and to provide a consistent docking experience across all docking stations to which the IHS is coupled, embodiments include configuration of IHS 100 in a manner that generates a docking profile that accounts for the user's selected docking configurations, and migrates these configurations to each unrecognized docking station. Through embodiments, an IHS 100 may configure available docking station capabilities as close as possible to the user's preferred docking settings, as recorded in one or more docking profiles that may be iteratively improved through local adjustments and through updates provided by a remote docking support service. In some embodiments, IHS 100 may include an embedded controller 126 that may execute program instructions that implement the migration of docking profiles for use on different docking stations.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by applications of the operating system of IHS 100. In some embodiments, wired and wireless network controllers 122, 123 may interface with a docking station to which the IHS 100 has been coupled As described in additional detail below, settings and preferences for use of wired and wireless connectivity provided by docking stations may be set forth in a docking profile that may be used to migrate the user's network settings for use on unrecognized docking stations. For example, the docking profile may be used in the migration of network setting such as whether to: rely on use of a network connection provided by the docking station, continue or terminate use of IHS wireless connectivity 123, utilize wireless connectivity to interoperate in managing the docking session with the docking station, etc., such that these network settings are consistently applied at each recognized or unrecognized docking station to which the IHS 100 is coupled.

Chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device. In some embodiments, IHS 100 may be a hybrid laptop computer that includes dual integrated displays incorporated in both of the laptop panels. IHS 100 may also support use of one or more external displays 113, such as external monitors that may be coupled to IHS 100 via a docking station. As described in additional detail below, display settings utilized by IHS 100, such as settings of graphics processor 107 and settings for use of multiple displays available through the docking station, may be set forth in a docking profile that may be used to migrate the user's display settings for use at unrecognized docking stations. For example, the docking profile may be used in the migration of display setting such as use of consistent extended desktop settings preferred by the user at each docking station to which the IHS 100 is coupled, such as use of specific screen resolutions by each of the available integrated and external displays and such as designation of one of the available displays as the main display.

In certain embodiments, chipset 103 may utilize one or more I/O controllers 110 that may each support hardware components such as user I/O devices. For instance, I/O controller 110 may provide access to one or more user I/O devices such as a keyboard, mouse, touchpad, touchscreen, microphone, speakers, camera and other input and output devices that may be integrated components of the IHS or that may be external devices that are coupled to IHS 100. Each of the supported user I/O devices may interface with the I/O controllers through wired or wireless connections. In some instances, these I/O controllers 110 may be used in the operation of I/O devices that are available via a docking station to which IHS 100 is coupled.

In certain embodiments, IHS 100 may include sensors 112 that provide access to data describing environmental and operating conditions of IHS 100. For instance, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100. Such sensors 112 may capabilities for detecting when a user is detected within a certain proximity to IHS 100. For instance, sensors 112 may detect when a user is in close proximity to the IHS 100 and, in some cases, whether the user is facing the display(s) 108, 113. Sensors 112 may also detect when a user is not in close proximity to the IHS 100, but is nonetheless sufficiently nearby that the user may still be actively using IHS 100, such as by monitoring the progress of an application running on an IHS from across the room.

As indicated in FIG. 1, an IHS 100 may include one or more I/O ports 116 that support removeable couplings with various types of external devices. I/O ports 116 may include various types of ports and couplings that support connections with external devices and systems, either through temporary couplings via ports, such as HDMI ports, accessible to a user via the enclosure of the IHS 100, or through more permanent couplings via expansion slots provided via the motherboard or via an expansion card of IHS 100, such as PCIe slots. I/O ports 116 may include multi-use ports, such as USB ports, and may also include specialized ports, such as a specialized docking port. In some embodiments, the docking port may be a specialized docking connector that interfaces with a corresponding connector of the docking station, where the docking port connection may be a wired connection that utilizes a cable, or may be implemented through directly connecting an IHS docking connector to a corresponding connector of the docking station.

In embodiments where IHS 100 includes USB ports, IHS 100 may include a USB controller 111 that, in some embodiments, may also implement functions of a USB hub. In some embodiments, USB controller 111 may be a dedicated microcontroller that is coupled to the motherboard of IHS 100. In other embodiments, USB controller 111 may be implemented as a function of another component, such as a component of a SoC (System on Chip) of IHS 100, embedded controller 126, processors 101 or of an operating system of IHS 100. USB controller 111 supports communications between IHS 100 and one or more USB devices coupled to IHS 100, whether the USB devices may be coupled to IHS 100 via wired or wireless connections. In some embodiments, a USB controller 111 may operate one or more USB drivers that detect the coupling of USB devices and/or power inputs to USB ports 127a-n. USB controller 111 may include drivers that implement functions for supporting communications between IHS 100 and coupled USB devices, where the USB drivers may support communications according to various USB protocols (e.g., USB 2.0, USB 3.0). In providing functions of a hub, USB controller 111 may support concurrent couplings by multiple USB devices via one or more USB ports 127a-n supported by IHS 100.

In some embodiments, USB controller 111 may control the distribution of both data and power transmitted via USB ports 127a-n. For instance, USB controller 111 may support data communications with USB devices that are coupled to the USB ports 127a-n according to data communication protocols set forth by USB standards. The power transmissions supported by USB controller 111 may include incoming charging inputs received via USB ports 127a-n, as well as outgoing power outputs that are transmitted from IHS 100 to USB devices that are coupled to USB ports 127a-n. In some embodiments, USB controller 111 may interoperate with embedded controller 126 in routing power inputs received via USB ports 127a-n to a battery charger 120 supported by the power supply unit 115 of IHS 100 and in routing power outputs from battery 124 to devices coupled to USB ports 127a-n. In some instances, power outputs provided from battery 124 to devices coupled to USB ports 127a-n may be supported by high-performance battery modes that may be used to rapidly charge the batteries of a device coupled to a USB port 127a-n.

In some embodiments, the multi-purpose USB port 127a-n connectors may be used as a docking interface between the IHS 100 and a docking station. In such instances, the USB controller 111 may manage a docking connection by which the IHS 100 may be operated by the user through the operation of peripheral devices that are coupled to the docking station. As described in additional detail below, the compatibility provided by use of a USB connection for docking the IHS may provide support for docking of the IHS to a large variety of docking stations. The default capabilities of the USB controller 111 may suffice in negotiating a functional docking connection with a large variety of docking stations. However, these default configurations may result in unused capabilities of the docking station and the peripheral devices that are available via the docking station. In scenarios where peripheral device capabilities are recognized and supported across docking stations, their configurations do not carry over, thus providing inconsistent behavior of similar devices. As described in additional detail below, embodiments utilize docking profiles that may be used to migrate consistent peripheral device behavior to unrecognized docking stations, such as disabling use of external cameras provided by docking stations.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) that may be stored in a non-volatile memory accessible by chipset 103 via bus 102. In some embodiments, BIOS may be implemented using a dedicated microcontroller coupled to the motherboard of IHS 100. In some embodiments, BIOS may be implemented as operations of embedded controller 126. Upon powering or restarting IHS 100, processor(s) 101 may utilize BIOS instructions to initialize and test hardware components coupled to the IHS 100. The BIOS instructions may also load an operating system for use by the IHS 100. The BIOS provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Some IHS 100 embodiments may utilize an embedded controller 126 that may be a motherboard component of IHS 100 and may include one or more logic units. In certain embodiments, embedded controller 126 may operate from a separate power plane from the main processors 101, and thus from the operating system functions of IHS 100. In some embodiments, firmware instructions utilized by embedded controller 126 may be used to operate a secure execution environment that may include operations for providing various core functions of IHS 100, such as power management and management of certain operating modes of IHS 100.

Embedded controller 126 may also implement operations for interfacing with a power supply unit 115 in managing power for IHS 100. In certain instances, the operations of embedded controller may determine the power status of IHS 100, such as whether IHS 100 is operating strictly from battery power, whether any charging inputs are being received by power supply unit 115, and/or the appropriate mode for charging the one or more battery cells 124a-n using the available charging inputs. Embedded controller 126 may support routing and use of power inputs received via a USB port 127a-n and/or via a power port 125 supported by the power supply unit 115. In addition, operations of embedded controller 126 may interoperate with power supply unit 115 in order to provide battery status information, such as the charge level of the cells 124a-n of battery 124.

In some embodiments, embedded controller 126 may also interface with power supply unit 115 in monitoring the battery state of battery 124, such as the relative state of charge of battery 124, where this charge level of the battery 124 may be specified as a percentage of the full charge capacity of the battery 124. In some instance, when operating from power stored in battery system 124, embedded controller 126 may detect when the voltage of the battery system 124 drops below a low-voltage threshold. When the charge level of battery 124 drops below such a low-voltage threshold, embedded controller 126 may transition the IHS to an off-power state in implementing a battery protection mode that preserves a minimal power level in battery 124.

Embedded controller 126 may also implement operations for detecting certain changes to the physical configuration of IHS 100 and managing the modes corresponding to different physical configurations of IHS 100. For instance, where IHS 100 is a laptop computer or a convertible laptop computer, embedded controller 126 may receive inputs from a lid position sensor that may detect whether the two sides of the laptop have been latched together, such that the IHS is in a closed position. In response to lid position sensor detecting latching of the lid of IHS 100, embedded controller 126 may initiate operations for shutting down IHS 100 or placing IHS 100 in a low-power mode.

In this manner, IHS 100 may support the use of various power modes. In some embodiments, the power modes of IHS 100 may be implemented through operations of the embedded controller 126 and power supply unit 115. In various embodiments, a mobile IHS 100 may support various low power modes in order to reduce power consumption and/or conserve power stored in battery 124. The power modes may include a fully on state in which all, or substantially all, available components of mobile IHS 100 may be fully powered and operational. In a fully off mode, processor (s) 101 may powered off, any integrated storage devices 119 may be powered off, and/or integrated displays 108 may be powered off.

In an intermediate low-power mode, various components of mobile IHS 100 may be powered down, but mobile IHS 100 remains ready for near-immediate use. In a standby power mode, which may be referred to as a sleep state or hibernation state, state information may be stored to storage devices 119 and all but a selected set of components and low-power functions of mobile IHS 100, such as standby functions supported by embedded controller 126, are shut down. In some embodiments, IHS 100 may include various high-power battery modes that may be used to support peak power demands for short durations. Such high-power battery modes allow the IHS to support high-performance computing tasks, but may result in rapid discharge of available battery power.

As described, IHS 100 may also include a power supply unit 115 that receives power inputs used for charging batteries 124 from which the IHS 100 operates. IHS 100 may include a power port 125 to which an AC adapter may be coupled to provide IHS 100 with a supply of DC power. The DC power input received at power port 125 may be utilized by a battery charger 120 for recharging one or more internal batteries 124 of IHS 100. As illustrated, batteries 124 utilized by IHS 100 may include one or more cells 124*a-n* that may connected in series or in parallel. Power supply unit 115 may support various modes for charging the cells 124*a-n* of battery 124 based on the power supply available to IHS 100 and based on the charge levels of the battery system 124. In certain embodiments, power supply unit 115 of IHS 100 may include a power port controller 114 that is operable for configuring operations by power port 125. In certain embodiments, power port controller 114 may be an embedded controller that is a motherboard component of IHS 100, a function supported by a power supply unit 115 embedded controller, or a function supported by a system-on-chip implemented by processors 101.

As indicated in FIG. 1, power supply unit 115 may receive power inputs from USB ports 127*a-n*. In a similar manner, power supply unit 115 may receive power inputs from any other I/O ports that support docking connections. Whether through a USB port or a dedicated docking port, default docking connections may utilize suboptimal power transfers from the docking station. Moreover, default docking connections may not account for the status of the battery 124 of the IHS, nor of any basis to prioritize charging of the battery using power transfers from the docking station. Each time a new docking station is utilized, different default power transfer capabilities of the docking station may be initiated. As described in additional detail below, embodiments may migrate power transfer capabilities for use with unrecognized docking stations and in returning to recognized docking stations, such that available power transfers are used consistently across different dockings stations in charging of the IHS batteries 124.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
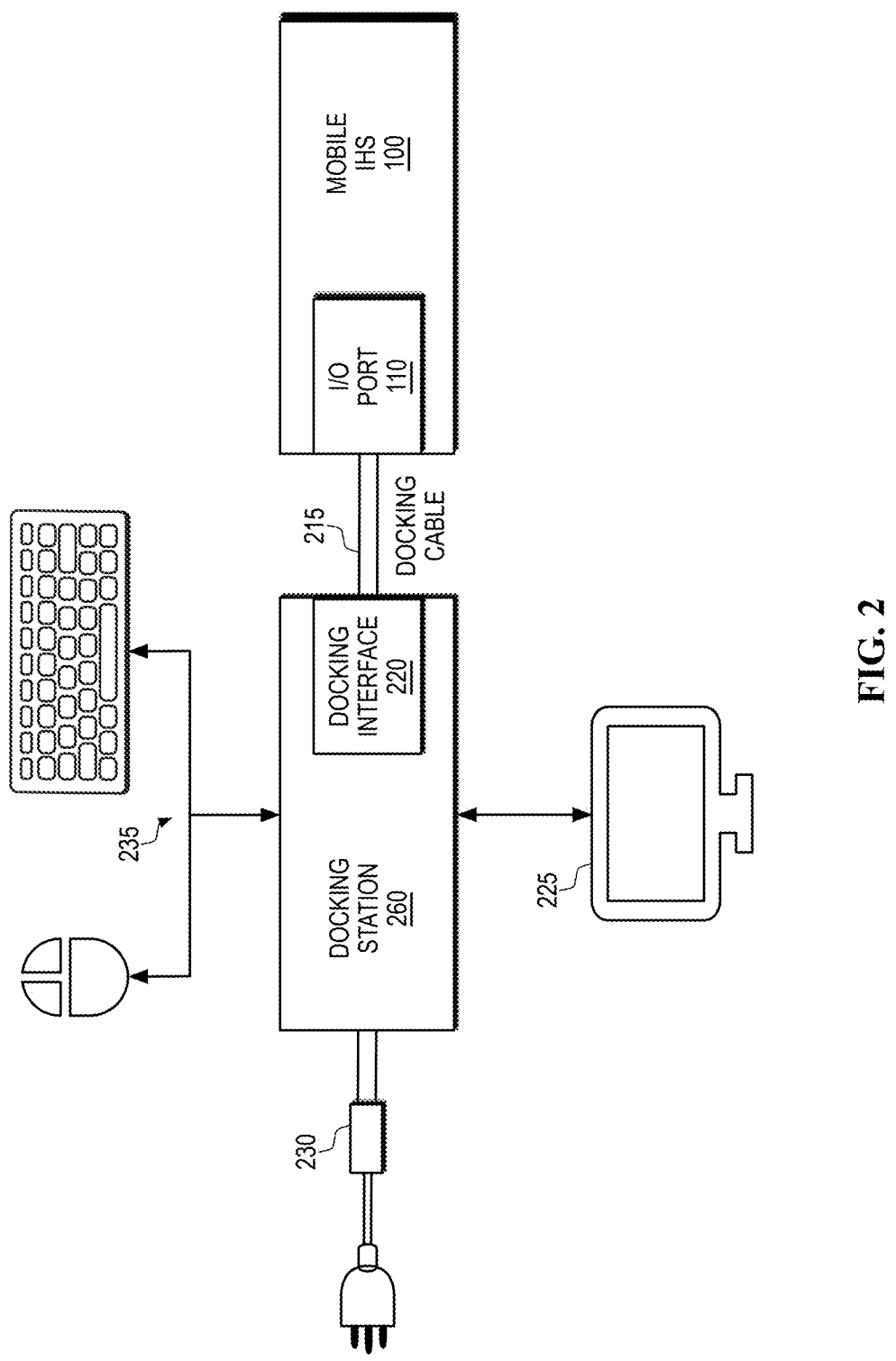
FIG. 2 is a block diagram depicting certain components of a docking system configured according to various embodiments for migration of docking profiles for operation of an IHS at different docking stations.

FIG. 2 is a block diagram depicting certain components of a docking system configured according to various embodiments for migration of docking profiles for operation of an IHS 100, such as described with regard to FIG. 1, at different docking stations. As described above, an IHS 100 may utilize different docking stations 260 in a variety of different locations, and thus in a variety of different scenarios. As illustrated, a docking station 260 may provide a user of IHS 100 with use of one or more external displays 225. A docking station 260 may also provide use of various additional peripheral I/O devices 235, such as a mouse and keyboard, which may be coupled to the docking station 260 via wired or wireless connections. While coupled to a docking station 260, mobile IHS 100 may be configured such that all user inputs and outputs generated in the operation of the IHS 100 are provided via docking station 260.

As illustrated, a IHS 100 may be coupled to a docking station 260 via a docking cable 215. As described above, this docking cable 215 may be a USB cable for some docking stations 260. As indicated in FIG. 2, the docking station 260 may include a docking interface 220 that receives one end of the docking cable 215, and the IHS 100 includes an I/O port 110 that receives the other end of the docking cable 215. In other types of docking interfaces, the IHS 100 may be coupled directly to a docking station, such as via mating of an external, specialized connector of the IHS with a compatible connector provided by the docking station.

In FIG. 2, a docking cable 215 is used to connect the docking station 260 and the IHS 100. In some docking scenarios, a wireless connection may be used to couple the IHS 100 to the docking station 260. In scenarios where wireless couplings are supported between the IHS 100 and docking station, wired couplings may also be supported. In such instances, wired docking cables 215 may be used for transmission of power from the docking station 260 to the IHS 100, while certain functions supported by the docking station 260, such as networking, may be supported in full or in part through wireless connections between the docking station 260 and IHS 100.

For instance, in some embodiments, a docking station 260 may include a capability by which the docking station 260 broadcasts a wireless signal identifying the docking station 260, and in certain instances, also identifying the devices coupled to the docking station 260. As described in additional detail below, this identity information for docking station 260 may be used in determining whether an existing docking profile for use in operation of this particular docking station, or to identify the closest matching docking profile that is maintained by the IHS, or that is remotely available via a docking support service.

As illustrated, a docking station 260 may include an AC adapter 230 by which the docking station 260 receives DC power. The docking station 260 may use the received DC power to provide power to IHS 100. Through embodiments, the preferred power transfer capabilities of the docking station 260 may be incorporated into a user's docking profiles and used in migrating these same power transfer settings upon the user coupling the IHS 100 to an unrecognized docking station.

FIG. 3 is a flow chart diagram illustrating certain steps of a process according to various embodiments for migration of docking profiles for operation of an IHS 100. As illustrated, embodiments may begin, at 205, with the initialization of a laptop or other IHS that may be coupled to a docking station, such as an IHS 100 described with regard to FIG. 1. Once the IHS has been initialized, the operating system of the IHS is booted and the user may commence operation of the IHS and may thus initiate use of software applications that are supported by the operating system. The IHS may be operated for any amount of time in the manner, when, at 310, embodiments detect the physical coupling of a device to an I/O port 110 of the IHS. In some scenarios, the I/O port 110 coupling may be connected while the IHS is off or otherwise in a low-power state, such that an I/O coupling may detected as part of the initialization of the IHS 100.

Upon the detection of the I/O port 110 coupling, at 315, embodiments determine whether the coupling is a docking port connection for docking the IHS 100 to a docking station 260. In some embodiments, the I/O port 110 may be specialized docking port such that any coupling detected at this port indicates a docking port connection. In some embodiments, the I/O port 110 may be a USB port or other multi-purpose port that may support docking port connections as well as a variety of other types of connections. In some embodiments, a USB docking station coupling may be identified by the IHS 100, such as by USB controller 111, based on specific device class codes other device identifier specified in USB descriptors used by the docking station in establishing the connection.

As indicated in FIG. 3, once the I/O port coupling has been determined to be a docking port coupling, at 320, embodiments may utilize the connection to interrogate the docking station for its identity, and in some instances, also for the identities of the peripheral devices that are currently coupled to the docking station and available for use by the IHS 100. In some embodiments, some or all of this identity information, such as model numbers or other device class identifiers, may be collected as part of the handshake by which a default docking port connection may be established As described above, some interrogation of the docking station 260 may be conducted via wireless signaling. In some embodiments, such wireless signaling between the IHS 100 and docking station 260 may be initiated as soon as the IHS 100 is in signaling proximity to the docking station, thus allowing the IHS to expedite identification of the docking station 260 and thus to expedite remote queries to a docking support service for use in identifying a docking profile for operation of a docking station that is unrecognized by the IHS such that no local docking profile is available to the IHS.

Once the identity of the docking station has been established, at 325, the IHS determines whether the coupled docking station is recognized by the IHS. As described in additional detail below, embodiments support creation of one or more docking profiles that correspond to docking preferences of the user of the IHS, where the docking profile may be associated with one or more docking stations. In embodiments, a generated docking profile may be associated within one or more specific docking stations (e.g., each identified by a serial number or other device unique identifier) and/or with one more types of docking stations (e.g., different models or other varieties of docking stations).

Accordingly, for a recognized docking station, a docking profile for operation of the IHS presumably exists. In such scenarios, at 330, embodiments load the identified docking profile that has been previously associated with the identified docking station, either specifically or by type. As described in additional detail below, the docking profile may include a variety of settings for use of resources provided by the docking station and a variety of docking settings preferred by the user. As a user makes modifications to docking settings, such as modifying an extended desktop configuration used when multiple displays are available, those changes are incorporate into one or more of the docking profiles maintained by the IHS. When a docking profile associated with the coupled docking station is located in a library of docking profiles maintained by the IHS, as indicated in FIG. 3, at 345, the loaded docking profile is used in the operation of the IHS using the peripheral devices that are available through the coupled docking station.

During use of the loaded docking profile, one or more adjustments may be made to the docking settings either by the user, or through automated updates. For instance, a user may alter the extended desktop settings to utilize only external displays available via the coupled docking station and to stop use of the integrated display of the IHS, thus allowing the integrated display to be powered down in order to prioritize available power transfers from the docking station for charging of the batteries 124 of the IHS. In other scenarios, a user may adjust the screen resolution, frame rate or color definition files used in the operation of any of the external displays that are coupled to the docking station.

In a similar manner, various other docking settings may be modified. For instance, power transfers provided via a wired docking port coupling may be augmented with wireless charging supported by the docking station. In addition to power transfers transmitted via a wired docking port connection, a docking station may also support wireless charging for use by the IHS or by a companion device, such as by a mobile phone. Embodiments may thus update, at 355, the operative docking profile, and any other related docking profiles in the IHS docking profile library, to reflect the user's activation of this additional charging capability. Upon subsequent docking of the IHS 100 to this docking station or another docking station associated with the same docking profile, embodiments may consult with the docking profile in configuring activation of the wireless charging capabilities by the docking station. In some embodiments, the updated docking profile may be shared with the docking support service, at 360, in order to aid the configuration of generic docking profiles for new users with no existing docking profiles.

In another power transfer scenario, a user may configure use of turbo power transfer modes that are supported by a docking station. As described, a docking port connection may be established through use of a multipurpose wired connection between the IHS and the docking station, such as via a wired USB connection. In such scenarios, a docking station may use this wired USB connection to transmit power to the IHS, thus providing the IHS with a source of power for charging its batteries. Such transmissions of power may thus be limited to the power transfers that are supported by the USB protocol. In USB scenarios, the default docking port connection may configure use of USB-PD (Power Delivery) power transmission by the docking station. Some docking stations may support higher-power transmissions, such as through specialized turbo power modes that transfer power over USB cabling through the operations of specialized USB controllers 111. For instance, specialized USB controllers of the IHS 100 and docking station may interoperate in transmission of power at the limits of the USB cabling used in the docking port connection, but above power transmissions supported by power transmission according to USB protocols. Upon configuration of such a power transfer setting, embodiments migrate this setting to unrecognized docking stations.

In other scenarios, docking settings may also be modified with regard to network capabilities provided by the docking station. As described, in addition to wired docking port coupling, some docking stations may also support a wireless connection with a coupled IHS. In some embodiments, a user may accept a recommendation to utilize this wireless signaling pathway as sideband communication pathway for use in management of the docking session. Upon this change being made to an ongoing docking session, embodiments may update the docking profile to reflect the user's activation of this sideband management pathway using wireless signaling. Upon subsequent docking of the IHS 100 to this docking station or another docking station associated with the same docking profile, embodiments may consult with the docking profile to activate use of this wireless sideband management channel.

In some docking stations, a wired network connection may be available to the IHS via the wired docking port coupling. In such instances, a user may choose to rely on faster Wi-Fi network connection provided by the IHS network controller 123 and defer use of the network connections provided by the docking station. Some users may prefer use of a slower, but more trusted, Wi-Fi connection over a faster connection provided by a public dockings station. Embodiments save the user from having to repeatedly make a similar configuration at other docking stations that include wired network connectivity.

In this manner, a variety of modifications may be made to the docking settings that are in use, with embodiments incorporating these changes into the operative docking profile and to related docking profiles. For instance, in addition to making changes to the operative docking profile that is currently in used, embodiments may make the same adjustment to docking profiles for related docking station models, docking profiles for docking stations by a specific manufacturer, docking profiles for docking stations that support a particular capability, such as wireless charging, etc. In this manner, embodiments may migrate user adjustments to dockings settings for use on other similar docking stations, as well as using these adjusted settings the next time the IHS 100 is coupled to this specific docking station and reloads the operative docking profile. Over time, a library of docking profiles may be generated and maintained by the IHS, where each of the docking profiles in the library may be adjusted to reflect applicable changes to the user's current docking preferences.

As indicated in FIG. 3, in some scenarios, at 325, the docking station to which the IHS 100 has been coupled is unrecognized and no docking profile has been associated with this docking station, or with this type of docking station. As described, some users may operate a mobile IHS 100 at various different locations where docking stations are available. Such users may experience inconsistent docking behavior at each of docking station that is used, with limited or no support in configuring docking with an unrecognized docking station. Accordingly, where the docking station is unrecognized, at 335, embodiments begin creation of docking profile for use in recording the docking settings for use during future docking sessions using this docking station. In some embodiments, the IHS 100 may consult a library of docking profiles that is maintained by the IHS in order to identify the docking profile that is the closest match to the coupled docking station.

In some scenarios, no docking profiles have been created, or the existing docking profiles maintained by the IHS are incongruous with the unrecognized docking station. Once the IHS library of docking profiles has been evaluated for a closest match, at 340, embodiments may query a remote docking support service for an initial docking profile to be used with the coupled docking station. In some embodiments, this initial docking profile provided by the docking support service may be generated without the IHS providing a closest matching docking profile from the IHS library of docking profiles, such as in scenarios where the library of docking profiles is still empty. In such embodiments, the docking support service may query one more data sources for a generic docking profile that is compatible with the coupled docking station and with the IHS.

In some embodiments, as part of its query to the docking support service, the IHS may provide the docking support service with the closest matching docking profile from the IHS library of docking profiles. In such instances, the docking support service may map docking preferences from the closest matching docking profile provided by the IHS to a generic docking profile that is compatible with the docking station, thus migrating at least a portion of the user's preferences from a related docking profile to this generic docking profile. Over time, this generic docking profile to which some of the user's preferences have been migrated, may be adapted further as the operative docking profile for use with the coupled docking station, and possibly with other related types of docking stations.

In mapping the closest matching docking profile to the generic profile identified by the docking support service, embodiments iterate through closest matching docking profile to see if any or all of them can be similarly configured in the generic docking profile. Any settings of the generic docking profile that remain unassigned may be set through evaluation of other docking profiles in the library maintained by the IHS to determine if this setting is present in other docking profiles, and/or may be set through queries by the docking support service to determine the most common configuration for this particular setting of the generic profile. In this manner, as many of the user's preferences as possible are migrated to the generic docking profile that will become the operative profile and the profile associated with the coupled docking station.

Through such embodiments, docking settings that are configured by the user may be both progressively adapted for use as the operative profile, while also supporting migration of these docking settings for use in the docking profile that is generated for use with an unrecognized docking station. Embodiments thus free a user from repeated manual configurations. For instance, docking stations may include an external camera that may be included in a docking session. Default settings may enable such external cameras as part of a docking session. Upon a user's manual disabling use of the external camera of a coupled docking station, this preferences is incorporated into the operative docking profile and. Additionally, upon a future docking of the IHS to an unrecognized docking station that includes an external cameras, embodiments may migrate this external camera to the docking profile generated for use on the unrecognized docking station.

In this same manner, docking settings for specific peripheral devices that may be coupled to a docking station may be migrated to new docking profiles generated for use on unrecognized dockings stations. For instance, audio setting for use with speakers that are available via a docking station may be migrated for use with any unrecognized docking station that includes speakers. In another scenario, the IHS may utilize Bluetooth to interface with a wireless user input device, such as a mouse or keyboard. In such instances, the network capabilities of the docking station may include an ability to pair with certain Bluetooth user input devices and incorporate their use into the wired docking connection that is in use, thus freeing the IHS from operation of these devices. The user may configure an ongoing docking session release IHS connections with such user input devices to allow their pairing directly with the docking station, thus allowing the Bluetooth controller of the IHS to be placed in a low-power mode and thus to utilize all available power being drawn from the docking station for charging of the batteries of the IHS. Upon the IHS being coupled to unrecognized docking station that supports this feature, the docking support service may consult this configuration in migrating user preferences to the generic docking profile.

In some embodiments, a docking support service may be provided by the manufacturer of the IHS, or another trusted entity, and provided to the user of the IHS as part of a contract for ongoing support of the IHS. In some instances, the docking support service may be provided by an employer that provides the user with use of the IHS 100 and docking stations at one or more locations. In some embodiments, the docking support service may be provided by an organization that supports the use of docking stations at one or more locations. For instances, a business or educational institution providing shared workspaces at multiple different locations, where the shared workspaces include docking stations, may provide the docking support service for assisting new users in configuring docking settings that can be used across the different locations being supported. The docking support service may interface with any number of other similar services and data sources to identify a generic docking profile for use with an unrecognized docking station and for determining appropriate configurations for docking settings that cannot be migrated from the user's closest matching docking profile or from any other docking profile in the IHS library of docking profiles.

As such, embodiments may provide migration of docking setting for use at unrecognized docking station in a manner that provides a user with consistent docking behavior at new docking stations and across all different docking stations that are utilized. In some embodiments, some or all of the migration of docking profiles may be operated, in full or in part, by an embedded controller 126 of the IHS. In some embodiments, the migration of docking profiles described herein may run as a process of the operating system of the IHS. In some embodiments, the migration of docking profiles may operate, at least in part, as user application of the operating system, providing the user with one or more graphical interfaces by which to accept or reject suggested modifications to the ongoing docking session, such as the described prompts requesting the user to confirm network connections, display settings, power transfers and additional peripheral devices to be utilized. Through such user inputs, the operative docking profile may be adapted, with the settings available as needed for migration to new docking profiles, thus saving the user from repeated manual configurations at unrecognized docking stations.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
   one or more processors;
   a memory device coupled to the one or more processors, the memory device storing computer-readable instructions that, upon execution by the one or more processors, cause the IHS to:
   detect a docking connection of the IHS to a docking station providing use of a plurality of peripheral devices that are coupled to the docking station;
   determine that the docking station is unrecognized and is not associated with a docking profile in a library of docking profiles;
   generate a docking profile for use of the docking station according to preferences of a user of the IHS; and adjust the generated docking profile based on the library of docking profiles, wherein the adjustments migrate user preferences from one or more of the docking profiles to the generated docking profile.

2. The IHS of claim 1, wherein execution of the instructions further causes the IHS to adjust the generated docking profile further based on changes by the user to a first docking setting.

3. The IHS of claim 1, wherein the plurality of peripheral devices comprise one or more displays.

4. The IHS of claim 3, wherein the adjustment of the generated docking profile comprises migration, from one of the docking profiles in the library of docking profiles, of an extended desktop configuration utilizing the one or more displays.

5. The IHS of claim 3, wherein the adjustment of the generated docking profile comprises migration, from one of the docking profiles in the library of docking profiles, of a color definition file for operation of the one or more displays.

6. The IHS of claim 1, wherein the adjustment of the generated docking profile comprises migration, from one of the docking profiles in the library of docking profiles, of a power setting for transferring a power from the docking station to the IHS.

7. The IHS of claim 6, wherein the power setting comprises a setting enabling a wireless charging capability of the charging station.

8. The IHS of claim 6, wherein the power setting comprises a setting enabling a turbo mode of power transfers from the charging station for use in charging one or more batteries of the IHS.

9. The IHS of claim 1, wherein the adjustment of the generated docking profile comprises migration, from one of the docking profiles in the library of docking profiles, of a network setting that terminates use of a wired network connection provided by the docking station and initiating use of a wireless network controller of the IHS.

10. The IHS of claim 1, wherein the adjustment of the generated docking profile comprises migration, from one of the docking profiles in the library of docking profiles, of a network setting that enables use of a wireless network connection between the IHS and the docking station.

11. The IHS of claim 1, wherein the docking profile is generated on behalf of the IHS by a remote docking support service based on an identity of the docking station reported by the IHS to the docking support service.

12. A method for supporting docking by an Information Handling System (IHS), the method comprising:

detecting a docking connection of the IHS to a docking station providing use of a plurality of peripheral devices that are coupled to the docking station;

determining that the docking station is unrecognized and is not associated with a docking profile in a library of docking profiles;

generating a docking profile for use of the docking station according to preferences of a user of the IHS; and adjusting the generated docking profile based on the library of docking profiles, wherein the adjustments migrate user preferences from one or more of the docking profiles to the generated docking profile.

13. The method of claim 12, further comprising adjusting the generated docking profile further based on changes by the user to a first docking setting.

14. The method of claim 12, wherein the docking profile is generated on behalf of the IHS by a remote docking support service based on an identity of the docking station reported by the IHS to the docking support service.

15. The method of claim 12, wherein the adjustment of the generated docking profile comprises migration, from one of the docking profiles in the library of docking profiles, of a power setting for transferring a power from the docking station to the IHS.

16. The method of claim 12, wherein the adjustment of the generated docking profile comprises migration, from one of the docking profiles in the library of docking profiles, of a network setting that enables use of a wireless network connection between the IHS and the docking station.

17. A computer-readable storage device having instructions stored thereon for supporting docking by an Information Handling System (IHS) comprising one or more processors, wherein execution of the instructions by the one or more processors of the IHS causes the one or more processors to:

detect a docking connection of the IHS to a docking station providing use of a plurality of peripheral devices that are coupled to the docking station;

determine that the docking station is unrecognized and is not associated with a docking profile in a library of docking profiles;

generate a docking profile for use of the docking station according to preferences of a user of the IHS; and adjust the generated docking profile based on the library of docking profiles, wherein the adjustments migrate user preferences from one or more of the docking profiles to the generated docking profile.

18. The computer-readable storage device of claim 17, wherein execution of the instructions further causes the one or more processors to adjust the generated docking profile further based on changes by the user to a first docking setting.

19. The computer-readable storage device of claim 17, wherein the docking profile is generated on behalf of the IHS by a remote docking support service based on an identity of the docking station reported by the IHS to the docking support service.

20. The computer-readable storage device of claim 17, wherein the adjustment of the generated docking profile comprises migration, from one of the docking profiles in the library of docking profiles, of a power setting for transferring power from the docking station to the IHS.

* * * * *